(12) United States Patent
Lee

(10) Patent No.: US 7,047,561 B1
(45) Date of Patent: May 16, 2006

(54) FIREWALL FOR REAL-TIME INTERNET APPLICATIONS

(75) Inventor: Michael C. G. Lee, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 931 days.

(21) Appl. No.: 09/671,250

(22) Filed: Sep. 28, 2000

(51) Int. Cl.
H04L 9/00 (2006.01)

(52) U.S. Cl. .......................................... 726/12; 726/13

(58) Field of Classification Search ................. 706/34, 706/204; 709/218, 223, 224, 225, 231, 232; 370/230, 901, 351, 353, 354, 355, 356, 352; 726/12, 13

See application file for complete search history.

(56) References Cited

U.S. PATENT DOCUMENTS

| | | | |
|---|---|---|---|
| 5,606,668 A * | 2/1997 | Shwed ........................ | 726/13 |
| 5,793,763 A * | 8/1998 | Mayes et al. ................ | 370/389 |
| 5,826,014 A * | 10/1998 | Coley et al. .................. | 726/12 |
| 5,968,176 A * | 10/1999 | Nessett et al. ................ | 726/11 |
| 6,006,272 A * | 12/1999 | Aravamudan et al. ...... | 709/245 |
| 6,061,798 A | 5/2000 | Coley et al. | |
| 6,119,171 A * | 9/2000 | Alkhatib ...................... | 709/245 |
| 6,400,707 B1 * | 6/2002 | Baum et al. ................. | 370/352 |
| 6,650,641 B1 * | 11/2003 | Albert et al. ............... | 370/392 |
| 6,728,885 B1 * | 4/2004 | Taylor et al. ................. | 726/24 |

OTHER PUBLICATIONS

Axent Technologies Inc., "Everything Your Need to Know About Network Security", pp. 1-33, 1998.
"NAT and Networks" www.suse,de/~mha/linux-ip-nat/diplom/node2.html.
"White Paper Definitions" www.e2s.be/Softwaremanagement/Surftwaremanagement/Surfcontrol/fdefns.htm.
"White Paper—The Firewall and Online Security", www.xpertdata.nl/service/papers/firewall.html.
"General Firewall White Paper" www.ntresearch. Com/firewall, htm.

* cited by examiner

Primary Examiner—Gregory Morse
Assistant Examiner—Thomas Ho
(74) Attorney, Agent, or Firm—Withrow & Terranova, PLLC

(57) ABSTRACT

The present invention relates to a firewall for use in association with real-time Internet applications such as Voice over Internet Protocol (VoIP). The firewall applies an application proxy to the signaling and control channels and a packet filter to the bearer channels. One of the features of hybrid firewall is that the application proxy can instruct the packet filter as to which bearer channels to enable and disable for the duration of a real-time Internet application session. The hybrid firewall can also intelligently perform network address translation (NAT) on Internet protocol packets incoming and outgoing to the firewall.

21 Claims, 6 Drawing Sheets

FIREWALL FOR REAL-TIME INTERNET APPLICATIONS

FIELD OF THE INVENTION

This invention relates to firewalls, and in particular to a firewall for use in association with real-time Internet applications.

BACKGROUND OF THE INVENTION

A firewall is a hardware and/or software component or set of components that intercepts data and thereby restricts access between a protected network and outside networks such as the Internet. Based upon one or more security policies, a firewall makes decisions as to whether or not to pass data to/from the protected network.

Firewalls can generally be classified as falling into one of four categories. The most basic category is the packet filter which works in the lower layers of the network protocol stack such as the transport layer and network layer. A packet filter examines all incoming and outgoing data packets and, based on pre-defined filtering rules, determines which packets will be allowed to pass. Filtering rules can be based on one or more factors, including type of packet, source and destination IP address, port number, etc. A packet filter is typically very fast, at least as compared to the other classifications of firewalls described below.

Another classification of firewall is the application proxy or proxy server. An application proxy operates at the upper levels of the protocol stack such as the application layer and presentation layer and provides proxy services on external networks for protected internal clients. The role of an application proxy is to communicate with external services on behalf of a client. While application proxies are more secure than packet filters, they are also much slower.

A third classification of firewall uses stateful packet inspection techniques that do not form part of the present invention.

A feature which can be included in any of the three types of firewalls described above involves the use of Network Address Translation (NAT). Firewalls using NAT hide the internal network protected by the firewall by converting the private, internal address of the network into an "official" address when packets are communicated across the firewall to the Internet. A traditional firewall using NAT usually only deals with information at the transport layer and network layer, not at the application layer.

Though originally designed for the transmission of data, IP networks are increasingly being used as an alternative voice communication tool. In recent years there have been many advancements and developments in the area of Internet applications for voice, facsimile, video, multi-media and voice-messaging for transport on an Internet Protocol network, rather than the Public Switched Telephone Network (PSTN).

Private networks of the type protected by one or more of the classifications of firewalls described above are increasingly being used to carry data packets for real-time Internet applications for voice, fax, video, multi-media and voice messaging calls. For voice calls, such real-time Internet applications are based on real-time Internet protocols such as H.323, MGCP, Megaco/H.248 and Session Initiation Protocol (SIP). Fax calls can be based on real-time Internet protocols such as T.38. In accordance with the real-time Internet protocols, there exist a combination of signaling channels, control channels and bearer channels. Each channel is created by and composed of a stream of data packets.

The difficulty is that real-time Internet communications such as voice, fax and video are very much affected by delays in transmission. For example, a voice call originating on a private network and communicating with a public network through an application proxy can render a useful VoIP communication difficult or impossible to achieve. An H.323 application proxy designed to pass H.323 type VoIP traffic is very processor intensive. Consequently, the service is slow and such a firewall cannot handle many VoIP calls simultaneously. The use of a packet filter, while much faster than an application proxy, is very insecure and is not an acceptable alternative.

A need therefore exists to provide the necessary speed for real-time Internet applications while not sacrificing system security.

SUMMARY OF THE INVENTION

The present invention relates to a firewall which is optimized for use with real-time Internet applications such as voice, fax, video or multimedia. The firewall includes an application proxy operating at the application layer (layer 7) for a portion of the real-time Internet application, and a packet filter operating at the network layer (layer 3) and the transport layer (layer 4) for another portion of the real-time Internet application. The use of such a hybrid firewall will provide the necessary speed for real-time Internet applications through use of the packet filter while not sacrificing system security through use of the application proxy.

In accordance with the protocols for real-time Internet applications, there exist a combination of signaling, control and bearer channels, which are created by a flow of data packets associated with each channel. The signaling and control channels are very vulnerable to external attacks, but are not relatively affected by reasonable delays. The bearer channels, on the other hand, are very much affected by delay (any more that 250 milliseconds of total delay causes serious audio degeneration). However, bearer channels are not very vulnerable to external attacks. This is because an attack on a bearer channel would not affect the overall operation of any network elements but would only cause the possible disruption of a voice conversation or fax transmission. Nonetheless, bearer channels must be protected from external attacks even though they are less susceptible to attack than signaling and control channels.

The hybrid firewall applies an application proxy to the signaling channel packets and the control channel packets and a packet filter to the bearer channel packets. Accordingly, the most vulnerable to attack signaling and control channels are protected by an application proxy while the less vulnerable bearer channels are handled with a minimum of delay but in a less secure (but still appropriately secure) manner by packet filtering.

One of the features of the hybrid firewall is that the application proxy will have full application knowledge of the signaling and control channels and will dynamically configure the packet filter to dictate security policy and allow bearer channel information to pass.

Another of the features of the hybrid firewall is the ability to intelligently perform network address translation (NAT) on packets incoming and outgoing to the firewall. In accordance with this feature, NAT is applied to the application layer of the packets composing the signaling and control channels for any embedded IP addresses and Transmission Control Protocol (TCP) or User Datagram Protocol (UDP)

port numbers in such packets. NAT compatibility is a basic problem with H.323 and other real-time Internet protocols in that IP addresses and TCP/UDP port numbers are contained in the data payload field of the signaling and control channel packets of the protocol. This feature of the hybrid firewall applies the signaling and control channel packets to an application proxy with full knowledge of the application. Thus when normal IP addresses and TCP/UDP port numbers are translated for the signaling, control and bearer channel packets, the application proxy is also able to reach into the data portion of a packet associated with a real-time Internet application and apply the same address and TCP/UDP port number translations.

Yet another feature of the hybrid firewall relates to keeping track of when a real-time Internet application session begins and coordinating NAT processing for the various channels by applying the signaling channels and control channels to an application proxy with full application knowledge. The application proxy commands and synchronizes NAT to assign network translations to the packets of all the channels as a group, both signaling and bearer, for the full duration of communications as indicated by the signaling and control channels. The bearer channel NAT is performed in conjunction with a packet filter, under control of the application proxy.

In accordance with a first aspect of the present invention there is provided a firewall for Internet protocol packets carrying data for a real-time Internet application. Each of the Internet protocol packets is associated with any one of a signaling channel, a control channel, or a bearer channel of said real-time Internet application. The firewall comprises an application proxy and a packet filter, the firewall applying the Internet protocol packets associated with the signaling channel and the control channel to the application proxy, and the firewall applying the Internet protocol packets associated with the bearer channel to the packet filter.

In accordance with a second aspect of the present invention there is provided a method of protecting a computer network transmitting and receiving data packets formatted in accordance with a real-time Internet protocol. Each of the data packets being associated with any one of a signaling channel, a control channel, or a bearer channel. The method comprises the steps of: i. receiving a stream of data packets, ii. applying the data packets associated with the signaling channel and the control channel to the application proxy, and iii. applying the data packets associated with the bearer channel to the packet filter.

In accordance with a third aspect of the present invention there is provided a computer readable medium containing computer instructions for protecting an Internet Protocol network transmitting and receiving data packets formatted in accordance with a real-time Internet protocol. Each of the data packets being associated with any one of a signaling channel, a control channel, or a bearer channel. The computer readable medium comprises computer program code, executable by a computer, for: i. receiving a stream of data packets, ii. applying the data packets associated with the signaling channel and the control channel to the application proxy, and iii. applying the data packets associated with the bearer channel to the packet filter.

BRIEF DESCRIPTION OF THE DRAWINGS

Preferred embodiments of the invention will now be described with reference to the attached drawings in which.

DETAILED DESCRIPTION OF THE PREFERRED EMBODIMENT

Figure 1:
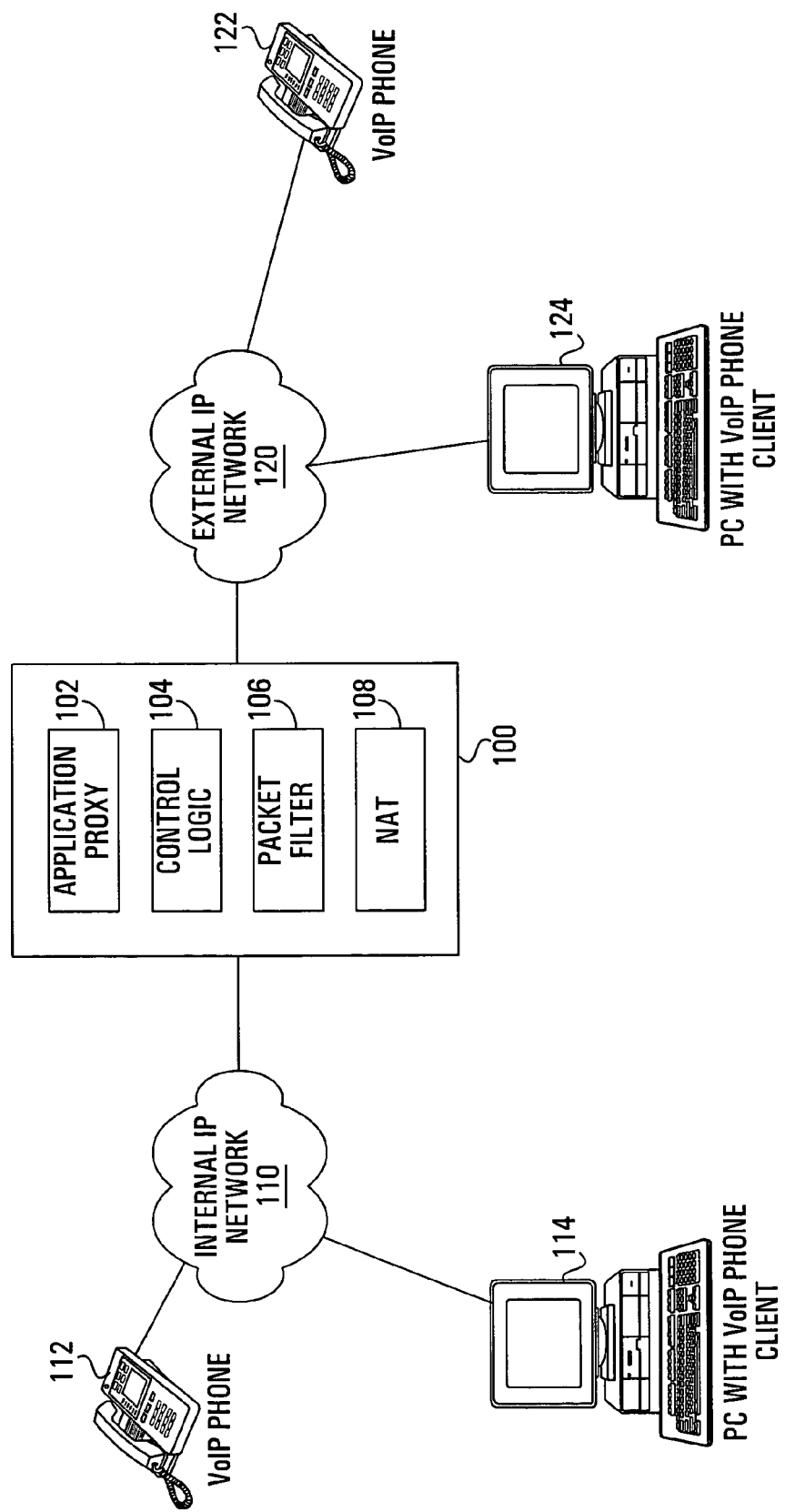
FIG. 1 is a schematic diagram of a computer network including a hybrid firewall.

FIG. 1 is a schematic diagram of a computer network including a hybrid firewall 100. Hybrid firewall 100 is placed between internal IP network 110 and external IP network 120, thereby protecting internal IP network 110 from attack from the outside. Of course, hybrid firewall 110 can be placed between two private networks, without affecting the method and system of the present invention. As with any other firewall, hybrid firewall 100 allows only limited access between networks 110 and 120. Specifically, hybrid firewall 100 restricts access to/from internal IP network 110 to one centralized point where all incoming and outgoing traffic is examined against one or more security policies.

Application proxy 102, control logic 104, packet filter 106 and NAT 108 are processes (either embodied in hardware, software or both) that operate the basic functions of hybrid firewall 100. Persons skilled in the art will appreciate that many other functional elements and processes normally associated with a firewall are not shown in FIG. 1 for the sake of clarity.

As described above, one technique to provide security to internal IP network 110 is known as packet filtering. In FIG. 1, packet filtering is accomplished through the use of packet filter 106 stored within hybrid firewall 100. Packet filter 106 examines address information contained in data packets received from external IP network 120 to determine whether to allow or block packets with certain characteristics. Packet filter 106 examines such packets at layer 3 and layer 4 to selectively control the flow of data to and from networks 110 and 120. Packet filter 106 will follow predetermined security rules that specify which types of packets to allow to pass and which types of packets to block.

In the case of IP protocol version 4, packets are allowed or blocked based on layer 3 information such as: (i) particular 32 bit IP source address, (ii) particular 32 bit IP destination address, (iii) protocol identifier (8 bits), which describes the protocol (e.g. TCP, UDP, ICMP. etc.) which will be contained in layer 4. Packets are allowed or blocked based on layer 4 information such as (i) particular TCP or UDP source port, and (ii) particular TCP or UDP destination port. For Internet Protocol version 6, a similar packet filtering procedure is followed.

After a packet is processed at layer 3 it is handed up to layer 4 to perform TCP or UDP processing, after which the data payload is passed up to the application layer. The simplicity of packet filter 106, as compared to application proxy 102, translates to very low delay through the firewall which is beneficial for real-time Internet bearer channel traffic such as voice, fax, video, multimedia, etc.

Application proxy 102 is a specialized application program running on hybrid firewall 100. Application proxy 102 takes a user's (such as VoIP phone 112 and PC with VoIP phone client 114) requests for service and forwards them, as appropriate according to the firewall security policy, to an external service (such as VoIP phone 122 and PC with VoIP phone client 124). Application proxy 102 runs transparently between a user and an external service. Instead of a user communicating with an external service directly, a user communicates with application proxy 102 which in turn communicates with an external service. In this way, application proxy 102 will only allow communications which are directly related to the desired service to pass thorough hybrid firewall 100. As well, application proxy 102 acts as a sacrificial lamb which will absorb any hacker attacks for a user.

NAT 108 is applied to layer 3 and layer 4 of a network protocol stack where IP source and destination addresses, and TCP or UDP port numbers are located. The security benefit of NAT is that the private, internal addresses in internal IP network 110 are converted into public IP addresses. NAT 108 can be used in a static mode, i.e. a fixed relation is established between a particular private address and a particular public address. More commonly, NAT 108 is used in a dynamic mode whereby a particular assignment of NAT translation is done on the fly from a pool of available public addresses.

Control logic 104 controls specific aspects of the hybrid firewall 100, including application proxy 102, packet filter 106 and NAT 108. Control logic 104 allows the operating parameters of the firewall to be specified. Control logic 104 will typically have some form of user-interface, for example a remote web based page, a remote command line interface (via a Telnet session), or a direct (physically attached) serial command line interface.

In the case of packet filter 106, control logic 104 will be used to specify which IP traffic is allowed to pass through the firewall 100 and which IP traffic is to be rejected. In the case of an application proxy 102, control logic 106 is used to specify which particular applications are to be enabled and thus what services the firewall will offer (e.g. allow or disable all or some particular web traffic, file transfers, via FTP or file transfer protocol, or VoIP traffic or other audio, video, multi-media, voice messaging traffic). For each type of traffic delivered to application proxy 102 there must be a full layer 7 application running. In the case of NAT 108, control logic 104 is used to specify the ranges of private IP address space, public IP address space, and policies relating to the address translation (for example, direct static mapping of addresses, dynamic mapping of addresses from a specific pool of addresses, etc). Control logic 104 additionally provides the logical interface between application proxy 102, packet filter 106 and NAT 108. In summary, control logic 104 allows security policy to be specified, and applies this policy to the various components and processes of hybrid firewall 100.

One of the features of hybrid firewall 100 is that application proxy 102 can instruct packet filter 106 as to which bearer channel packets (i.e. stream of packets associated with the bearer channel) to enable and disable for the duration of a real-time Internet application session. This will minimize the length of time that any security breach could occur. For example, when application proxy 102 detects that a call setup is being requested, it can dynamically enable packet filter 106 to allow the specific bearer channel packets associated with that call to pass through the firewall and only to specific IP addresses. As well, application proxy 102 will monitor any ongoing real-time Internet application sessions and upon a session ending, application proxy 102 will detect this by the signaling channel activity and will again dynamically command packet filter 106 to disable the specific ports and addresses associated with the call. In this way, application proxy 102 acting on the signaling and control channels will open and close connections as needed for bearer channels by altering the policy of the packet filter, thereby minimizing the time that any addresses and ports are open. The benefit of this approach is that a simple packet filter can be intelligently instructed by application proxy 102 to allow or disallow certain bearer channel information to pass based on layer 3 and layer 4 information.

Other features of hybrid firewall 100 relate to NAT and the fact that application proxy 102 can ascertain application information from the signaling and control channels of a real-time Internet application session in order to intelligently apply NAT to the bearer channel packets, signaling channel packets, and control channel packets (i.e. any of the packets associated with the bearer, signaling and control channels).

All real-time Internet data protocols, including VoIP, provide for some addressing information to be contained within the data payload of the signaling packets. This presents a very difficult situation for traditional NAT devices since these devices only examine the source and destination addresses and TCP/UDP ports and do not examine the data payload (i.e. NAT usually only looks at layer 3 and a limited amount of layer 4 information, not layer 7 application information). If such a packet were to go through a traditional NAT device, the source and destination addresses would be translated properly, but any address information within the data payload would not be translated. If this were to happen there would be a mismatch between the required addresses and the real-time Internet application would not work properly.

With hybrid firewall 100, NAT 108 can reach into the upper layer of the signaling channel packets and control channel packets (layer 7) to translate any embedded IP addresses or TCP or UDP port numbers. For example, application proxy 102, upon receipt of information from NAT 108 regarding a particular dynamically assigned address/port translation, can then apply the same translations to the embedded addresses within the data payload (layer 7) of the signaling and control channel packets of the real-time Internet protocol. Whenever NAT is required, application proxy 102 will dynamically change the address of information embedded within the data payload (layer 7 information) in synchronization with the address translations which are being applied to the source and destination address and port information within the IP and TCP headers (layer 3 and layer 4 information).

Another feature of hybrid firewall 100 relating to NAT is that application proxy 102 can instruct NAT 108 to apply translations to all channels of a real-time Internet application session for the duration of the session independent of traffic flow. NAT is usually operational only when data traffic is flowing. NAT will therefore time out and stop translating if there is a pause in transmission. To overcome this problem some real-time Internet applications send dummy traffic just to keep NAT operational for the duration of a real-time Internet application session. This is not necessary with the use of hybrid firewall 100. Since application proxy 102 is able to determine the duration of a real-time Internet application session independent of traffic flow on any of the bearer, signaling or control channels, NAT 108 can be instructed to be in place for all channels associated with a particular call for as long as any call is present without any danger of timing out due to inactivity on one of the channels. This provides the concept of a call session independent of the timing of packet flow on any of the bearer, signaling or control channels. Thus, NAT 108 can apply NAT translation to layer 3, layer 4 and layer 7 of the signaling and control channel packets, and NAT translation to layer 3 and layer 4 of the bearer channel packets all at once in synchronization with each other, independent of packet flow on any of the channels.

Figure 2:
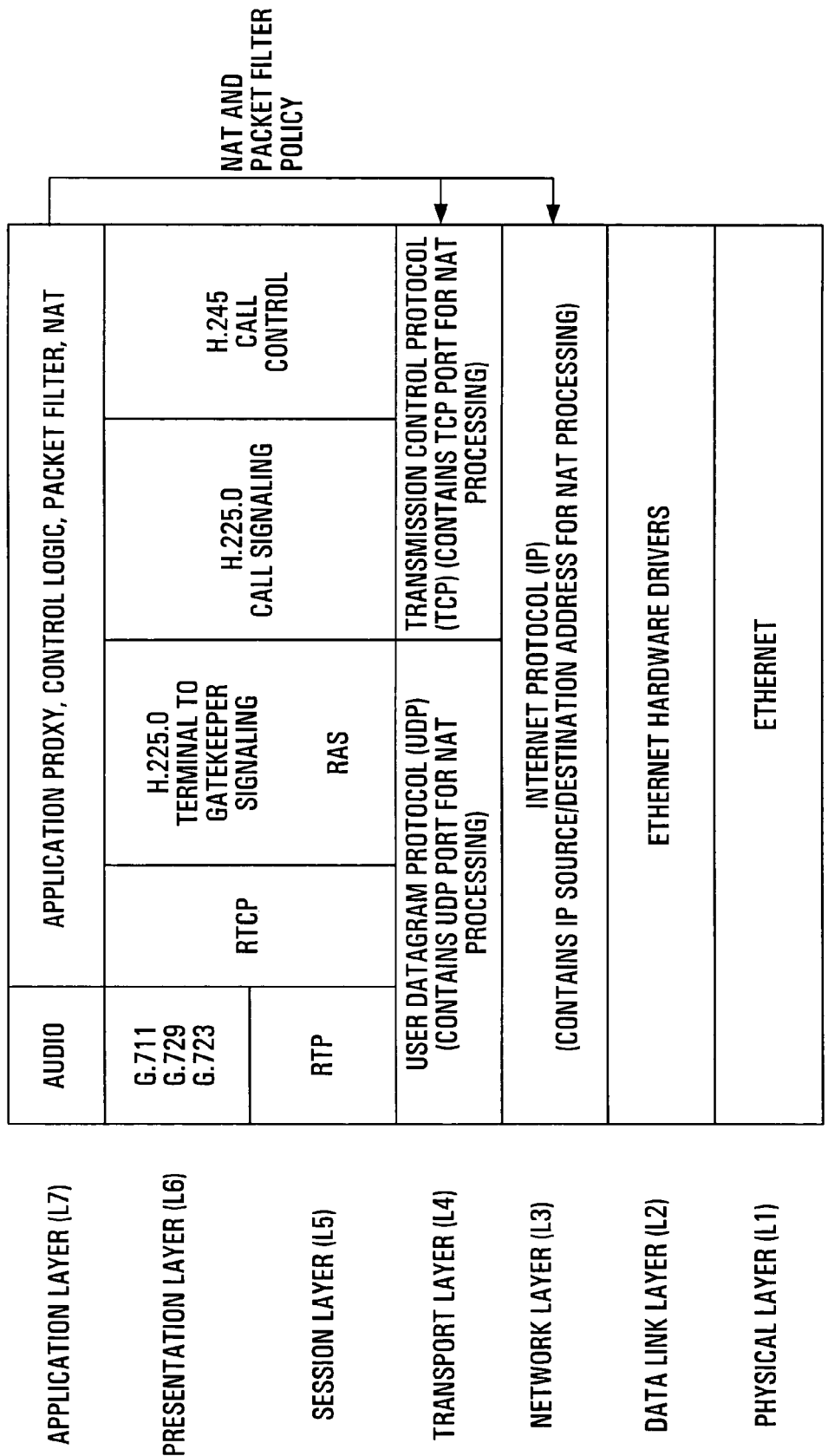
FIG. 2 is a schematic diagram of the software layers of the hybrid firewall for a H.323 VoIP call.

FIG. 2 is a schematic diagram of the software layers of the hybrid firewall for a H.323 VoIP call. Note that the H.323 protocol is used in this figure for illustration purposes only.

Figure 3:
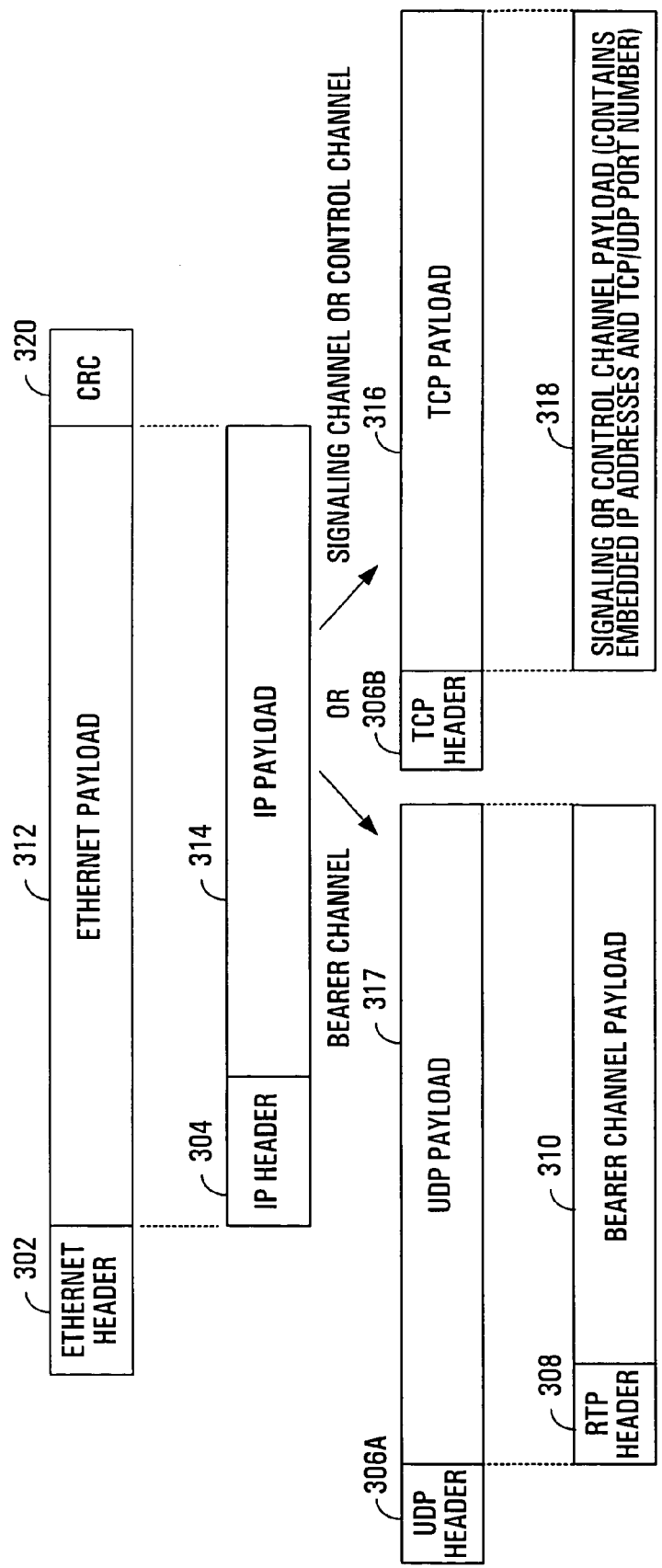
FIG. 3 is a schematic diagram of the format of a single packet associated with either the bearer channel, the control channel or the signaling channel.

FIG. 3 is a schematic diagram of the format of a single packet associated with either the bearer channel, the control channel or the signaling channel. For these three channels, the first header of the packet is the Ethernet header 302, which corresponds to layer 1 or the physical layer. Following the Ethernet header 302 is the Ethernet payload 312. Following the Ethernet payload 312 is the Cyclic Redundancy Check (CRC) 320. (Note that other physical protocols could be used such as Asynchronous Transfer Mode (ATM) in which case the layer 1 packet format would be different).

The next header is the Internet Protocol header 304 (corresponding to layer 3) which is associated with the network routing. The IP payload 314 (comprising either bearer channels or control or signaling channels) follows next.

At layer 4, the next header 306a, 306b defines, among other things, whether the packet is associated with a bearer channel (in the case of 306a) or a control or signaling channel (in the case of 306b). In the bearer channel, after the UDP header 306A, there is the UDP payload 317 which is made up of a Real Time Protocol (RTP) header 308 and the actual bearer channel payload 310. For the control channel or signaling channel, the TCP payload 316 (comprising the signaling or control channel payload 318) follows directly after the TCP header 306B.

Depending on the nature of the bearer channel payload (i.e. fax, video, multi-media, voice messaging), there may be appropriate modifications made to the structure of a packet for the bearer channel, the control channel and the signaling channel shown in FIG. 3.

Figure 4:
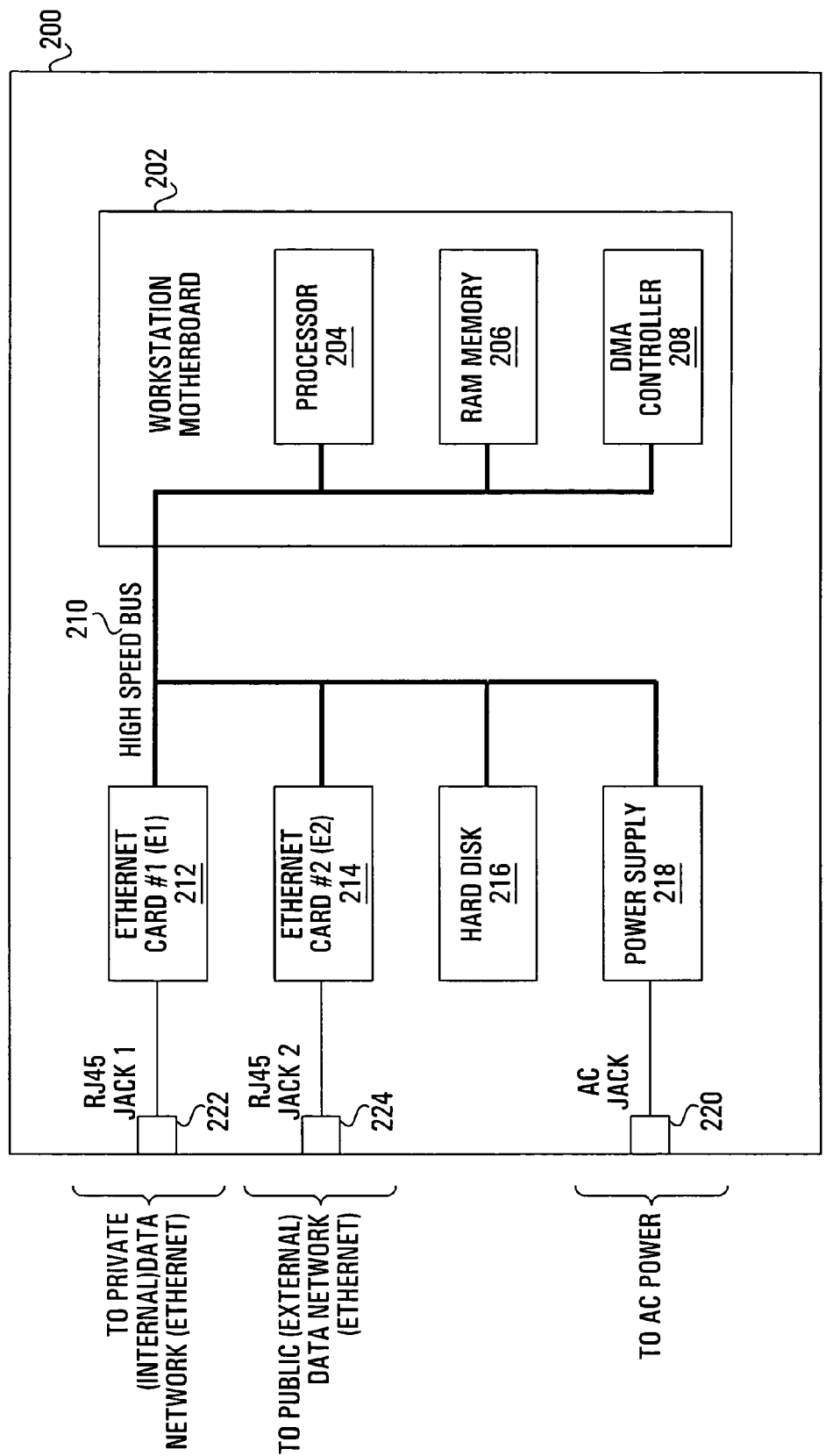
FIG. 4 is a schematic diagram of an embodiment of a hybrid firewall comprising a dual homed commercial workstation.

FIG. 4 is a schematic diagram of one embodiment of hybrid firewall 100, in this case comprising a dual homed commercial workstation such as a Sun Solaris or HP or high end Windows machine. Hybrid firewall 100 can be implemented in a computer network in a number of ways, including by means of a stand-alone device (for example a general purpose workstation, or dedicated hardware firewall appliance, or application specific integrated circuit) or by a shared network device such as would be provided by an Internet Service Provider (ISP) to dial-up or Digital Subscriber Line (DSL) clients. Hybrid firewall 100 could also be included in client workstations or Personal Computers (PCs) to provide firewall services to a specific user only. Hybrid firewall 100 could be comprised within any other host computer or hardware/software arrangement or device capable of providing the necessary speed and security necessary to implement the present invention.

A dual homed workstation of the type shown in FIG. 4 is a general purpose computer or workstation which has two network interfaces (or homes) into two different networks. The first network interface comprises RJ45 Jack 1 222 and Ethernet card #1 212 which are connected to internal IP network 110 illustrated in FIG. 1. The second network interface comprises RJ45 Jack 2 224 and Ethernet card #2 214 which are connected to external IP network 120. The network interfaces shown in FIG. 4 are both high speed Ethernet (100 base T) however many different network interfaces could be used such as slower 10 base T Ethernet, OC1, OC3 or other optical links, frame relay, ATM or any other network interface. Ethernet is chosen for ease of description.

Application proxy 102, control logic 104, packet filter 106 and NAT 108 (as illustrated in FIG. 1) are stored in hard disk 216 and executed on workstation motherboard 202 through the use of processor 204, RAM memory 206 and DMA controller 208. Power to the work station is provided through AC Jack 220 and power supply 218, which are connected to high speed bus 210. High speed bus 210 connects Ethernet cards #1 and #2 and hard disk 216 to workstation motherboard 202.

Figure 5:
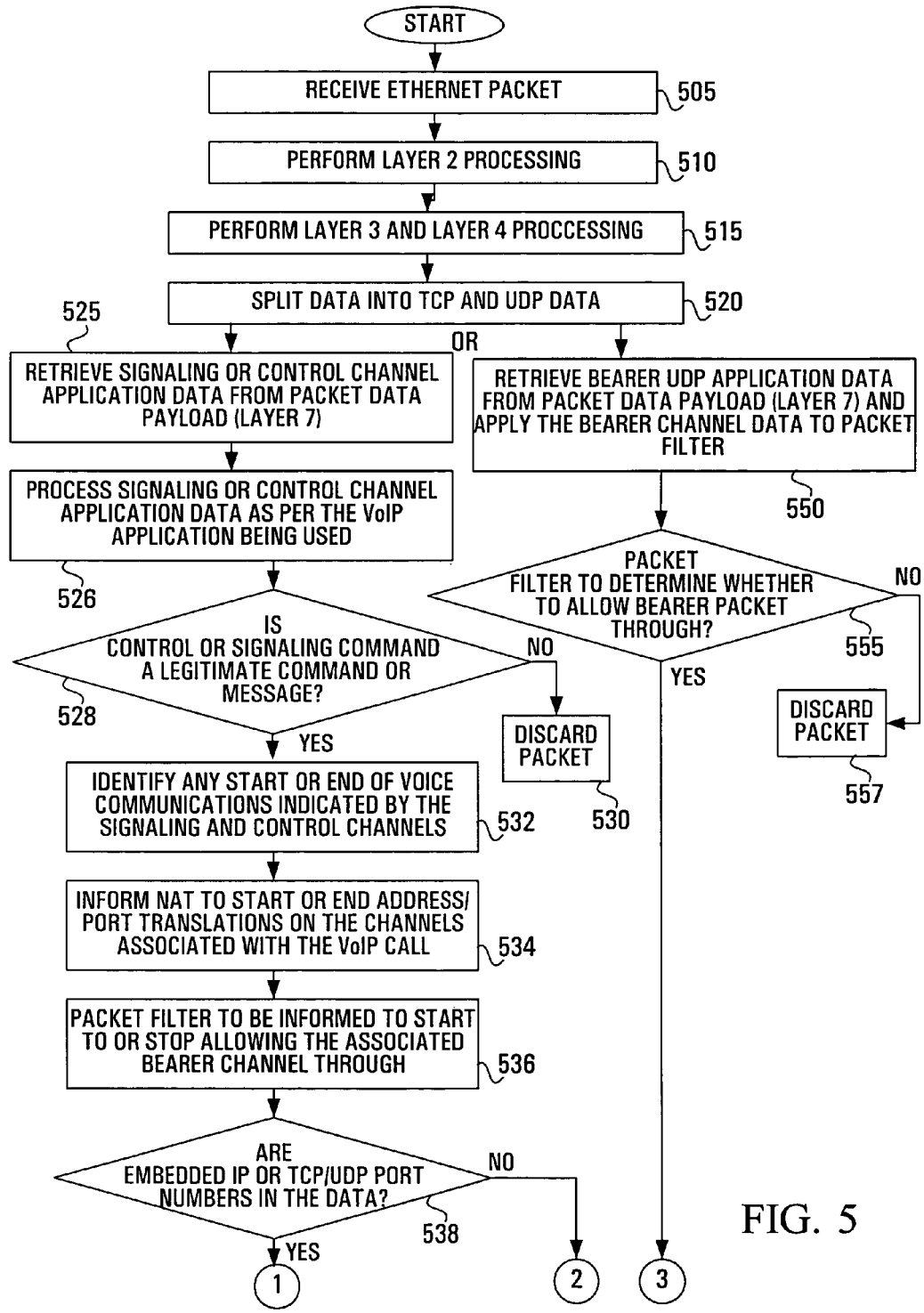
FIG. 5 is a flowchart of the steps that may be undertaken by a hybrid firewall following receipt of an Ethernet packet.
Figure 5:
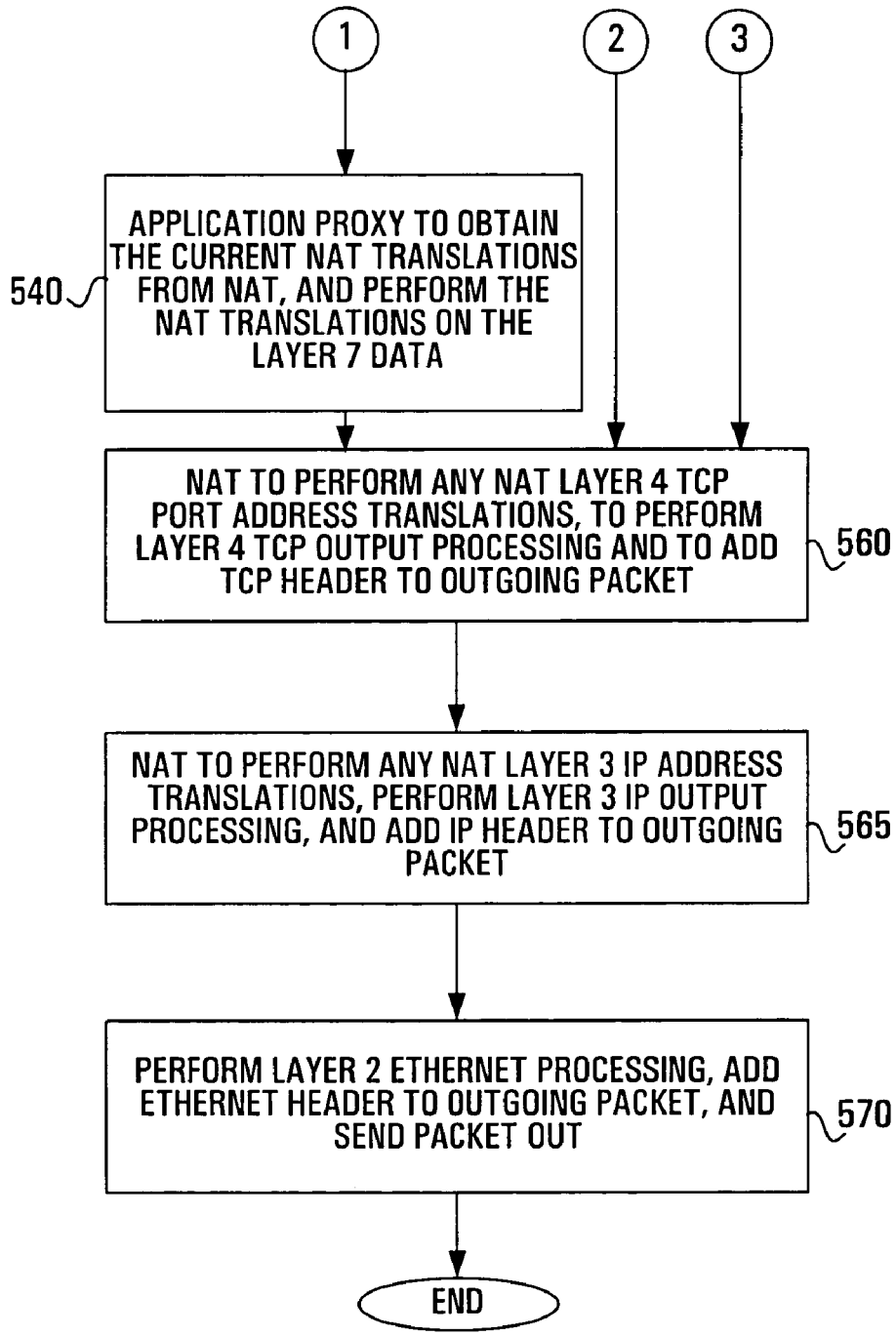

FIG. 5 is a flowchart of the steps that may be undertaken by hybrid firewall 100 following receipt of an Ethernet packet. These steps are:

Step 505. Receive an Ethernet packet from either the public or private data network via Ethernet card #1 212 or Ethernet card #2 214;

Step 510. On the Ethernet card in which the packet was received, strip off Ethernet header from packet and perform Ethernet processing (layer 2), and send output packet to processor 204.

Step 515. Processor 204 to strip off IP header from output packet and perform IP processing (layer 3) and to strip off TCP header or UDP header and perform TCP or UDP processing, as appropriate (layer 4); and Step 520. Processor 204 to split data packets into TCP (those packets associated with the control or signaling channel) or UDP (those packets associated with bearer channel) data.

For the Control or Signaling Channel (TCP Data):

Step 525. Processor 204 to retrieve signaling or control channel application data from packet data payload (layer 7);

Step 526. Application proxy 102, running on processor 204, to process signaling or control channel application data as per the real-time Internet application being used (H.323, SIP, etc.);

Step 528. Application proxy 102, running on processor 204, to determine if the control or signaling command is a legitimate command or message as per the real-time Internet application being used. If so, the packet is allowed to be processed further, and if not, the packet is discarded (at step 530);

Application proxy 102, running on processor 204, to:

Step 532. Identify any start or end of communications indicated by the signaling and control channels;

Step 534. Inform NAT 108 to start or end address/port translations on the packets of channels associated with the real-time Internet application session;

Step 536. Inform packet filter 106 to start to or stop allowing the packets from the associated bearer channel through;

Step 538. Application proxy 102, running on processor 204, to determine if there are embedded IP or TCP/UDP port numbers in the data.

Step 540. If yes, application proxy 102 to obtain the current NAT translations from NAT 108, and perform the NAT translations on the layer 7 data. If no, step 560 is proceeded to directly.

Step 560. NAT 108, also running on processor 204, to perform any NAT layer 4 TCP port address translations, to perform layer 4 TCP output processing and to add TCP header to outgoing packet;

Step 565. NAT 108, running on processor 204, to perform any NAT layer 3 IP address translations, perform layer 3 IP output processing, and add IP header to outgoing packet; and Step 570. Processor 204 to send packet to the opposite Ethernet card #1 212 or Ethernet card #2 214 than the packet was received from. Ethernet card #1 212 or Ethernet card #2 214 to perform layer 2 Ethernet processing, add Ethernet header to outgoing packet, and send packet out via either RJ45 Jack 1 222 or RJ45 Jack 2 224.

For Data in Bearer Channel (UDP Data)

Step 550. Processor 204 to retrieve bearer UDP application data from packet data payload (layer 7) and apply the bearer channel packet to packet filter 106;

Step 555. Packet filter 106, running on processor 204, to determine whether to allow the particular bearer packet through, based on predetermined packet filtering rules. If yes, the bearer packet is allowed to be processed further, and if no the packet is discarded (at step 557);

Step 560. NAT 108, running on processor 204, to perform any NAT layer 4 TCP port address translations, perform layer 4 TCP output processing, and add TCP header to outgoing packet;

Step 565. NAT 108, running on processor 204, to perform any NAT layer 3 IP address translations, perform layer 3 IP output processing, and add IP header to outgoing packet;

Step 570. Processor 204 to send packet to the opposite Ethernet card #1 212 or Ethernet card #2 214 than the packet was received from. Ethernet card #1 212 or Ethernet card #2 214 to perform layer 2 Ethernet processing, add Ethernet header to outgoing packet, and send packet out via either RJ45 Jack 1 222 or RJ45 Jack 2 224.

The above description of a preferred embodiment should not be interpreted in any limiting manner since variations and refinements can be made without departing from the spirit of the invention. The scope of the invention is defined by the appended claims and their equivalents.

We claim:

1. A firewall for Internet protocol packets carrying data for a real-time Internet application, each of said Internet protocol packets being associated with any one of a signaling channel, a control channel, or a bearer channel of said real-time Internet application, the firewall comprising:

an application proxy and a packet filter, the firewall applying the Internet protocol packets associated with the signaling channel and the control channel to the application proxy, and the firewall applying the Internet protocol packets associated with the bearer channel to the packet filter.

2. The firewall of claim 1 wherein said real-time Internet application is Voice over Internet Protocol (VoIP).

3. The firewall of claim 1 wherein said real-time Internet application is fax over Internet.

4. The firewall of claim 1 wherein said real-time Internet application is video over Internet.

5. The firewall of claim 1 wherein said real-time Internet application is voice messaging over Internet.

6. The firewall of claim 1 wherein the application proxy instructs the packet filter as to which Internet protocol packets associated with a particular bearer channel to enable and disable for the duration of a session of said real-time Internet application.

7. The firewall of claim 1 further including a Network Address Translation (NAT) process to translate any Internet Protocol (IP) addresses, Transmission Control Protocol (TCP) port numbers or User Datagram Protocol (UDP) port numbers contained at layer 3 and layer 4 of the Internet protocol packets associated with the signaling channel, the control channel and the bearer channel.

8. The firewall of claim 1 further including a Network Address Translation (NAT) process to translate any Internet Protocol (IP) addresses, Transmission Control Protocol (TCP) port numbers or User Datagram Protocol (UDP) port numbers contained at layer 7 of the Internet protocol packets associated with the signaling channel and the control channel.

9. The firewall of claim 8 wherein said application proxy instructs said NAT process to operate for the duration of a session of said real-time Internet application independent of data traffic flow.

10. The firewall of claim 1 further including a control logic process for specifying the operating parameters of the firewall.

11. The firewall of claim 1 wherein said application proxy and said packet filter ane housed in any one of a dual homed commercial workstation, a general purpose workstation, a dedicated hardware firewall appliance, or an application specific integrated circuit.

12. A method of protecting a computer network transmitting and receiving Internet protocol packets formatted in accordance with a real-time Internet protocol, each of said Internet protocol packets being associated with any one of a signaling channel, a control channel, or a bearer channel, the method comprising the steps of:

i. receiving a stream of Internet protocol packets, ii. applying the Internet protocol packets associated with the signaling channel and the control channel to an application proxy, and iii. applying the Internet protocol packets associated with the bearer channel to a packet filter.

13. The method of claim 12 further comprising the step of the application proxy instructing the packet filter as to which bearer channels to enable and disable for the duration of an Internet application session utilizing said real-time Internet protocol.

14. The method of claim 12 further comprising the step of applying a NAT process to translate any Internet Protocol (IP) addresses, Transmission Control Protocol (TCP) port numbers or User Datagram Protocol (UDP) port numbers contained at layer 3 and layer 4 of the Internet protocol packets associated with the signaling channel, the control channel and the bearer channel.

15. The method of claim 12 further comprising the step of applying a NAT process to translate any Internet Protocol (EP) addresses, Transmission Control Protocol (TCP) port numbers or User Datagram Protocol (UDP) port numbers contained at layer 7 of the Internet protocol packets associated with the signaling channel and the control channel.

16. The method of claim 14 further comprising the step of the application proxy instructing the NAT process to operate for the duration of an Internet application session utilizing said real-time Internet protocol independent of data traffic flow.

17. A computer readable medium containing computer instructions for protecting an Internet Protocol network transmitting and receiving Internet protocol packets foxed in accordance with a real-time Internet protocol, each of said Internet protocol packets being associated with any one of a signaling channel, a control channel, or a bearer channel, said computer readable medium comprising computer program code, executable by a computer, for:
i. receiving a stream of Internet protocol packets,
ii. applying the Internet protocol packets associated with the signaling channel and the control channel to an application proxy, and
iii. applying the Internet protocol packets associated with the bearer channel to a packet filter.

18. The computer readable medium of claim 17 further comprising computer program code, executable on a computer, for the application proxy to instruct the packet filter as to which bearer channels to enable and disable for the duration of an Internet application session utilizing said real-time Internet protocol.

19. The computer readable medium of claim 17 flier comprising computer program code, executable on a computer, for a NAT process, and for applying the NAT process to translate any Internet Protocol (IP) addresses, Transmission Control Protocol (TCP) port numbers or User Datagram Protocol (UDP) port numbers contained at layer 3 and layer 4 of the Internet protocol packets associated with the signaling channel, the control channel and the bearer channel.

20. The computer readable medium of claim 17 further comprising computer program code, executable on a computer, for a NAT process, and for applying the NAT process to translate any Internet Protocol (IP) addresses, Transmission Control Protocol (TCP) port numbers or User Datagram Protocol (UDP) port numbers contained at layer 7 of the Internet protocol packets associated with the signaling channel and the control channel.

21. The computer readable medium of claim 19 further comprising computer program code, executable on a computer, for the application proxy to instruct the NAT process to operate for the duration of an Internet application session utilizing said real-time Internet protocol independent of data traffic flow.

* * * * *

UNITED STATES PATENT AND TRADEMARK OFFICE
CERTIFICATE OF CORRECTION

PATENT NO.         : 7,047,561 B1                                          Page 1 of 1
APPLICATION NO.    : 09/671250
DATED              : May 16, 2006
INVENTOR(S)        : Lee It is certified that error appears in the above-identified patent and that said Letters Patent is hereby corrected as shown below:

In the Claims

Column 10, line 23
  replace "filter ane housed"
  with --filter are housed--

Column 10, lines 52-53
  replace "Internet Protocol (EP) addresses"
  with --Internet Protocol (IP) addresses--

Column 10, line 64
  replace "packets foxed in"
  with --packets formatted in--

Column 11, lines 15-16
  replace "claim 17 flier comprising"
  with --claim 17 further comprising--

Signed and Sealed this
Second Day of December, 2014

Michelle K. Lee
*Deputy Director of the United States Patent and Trademark Office*